United States Patent [19]

McCaleb

[11] E Re. 29,151

[45] Reissued Mar. 15, 1977

[54] REPULSING CLAYS ON DRILL BITS

[75] Inventor: Stanley B. McCaleb, Richardson, Tex.

[73] Assignee: Sun Oil Company, Dallas, Tex.

[22] Filed: Mar. 27, 1975

[21] Appl. No.: 554,883

Related U.S. Patent Documents

Reissue of:

[64] Patent No.: 3,818,996
Issued: June 25, 1974
Appl. No.: 296,358
Filed: Oct. 10, 1972

[52] U.S. Cl. ..... 175/57; 166/65 M; 166/301; 175/68; 175/320

[51] Int. Cl.[2] ..... E21B 7/00; E21B 17/00

[58] Field of Search ..... 175/57, 64, 320, 323, 175/324, 325, 409–411, 68; 166/301, 65 R, 65 M; 204/DIG. 6, 299, 180 R, 180 B

[56] References Cited

UNITED STATES PATENTS

| | | | |
|---|---|---|---|
| 1,804,078 | 5/1931 | Baden | 166/65 R X |
| 2,032,624 | 3/1936 | Lyons | 204/180 R X |
| 2,283,206 | 5/1942 | Hayward | 175/64 X |
| 2,372,575 | 3/1945 | Hayward | 166/301 |
| 2,466,239 | 4/1949 | Holcombe | 166/244 C |
| 3,137,355 | 6/1964 | Schumacher, Jr. | 175/410 X |
| 3,251,427 | 5/1966 | Ewing | 175/320 |
| 3,294,184 | 12/1966 | O'Brien | 175/324 X |
| 3,294,186 | 12/1966 | Buell | 175/410 |
| 3,311,181 | 3/1967 | Fowler | 175/410 |
| 3,346,060 | 10/1967 | Beyer | 175/410 |
| 3,734,181 | 5/1973 | Shaffer | 166/65 R X |

FOREIGN PATENTS OR APPLICATIONS

| | | | |
|---|---|---|---|
| 806,844 | 4/1951 | Germany | 175/57 |
| 501,835 | 5/1937 | United Kingdom | |
| 154,201 | 3/1962 | U.S.S.R. | 166/301 |

*Primary Examiner*—Stephen J. Novosad
*Attorney, Agent, or Firm*—Donald R. Johnson; George L. Church

[57] ABSTRACT

Bit balling is prevented by impressing a negative electrical charge on the drill bit by the use of bi-metallic electromotive potential differences, batteries or other electrical energy sources.

8 Claims, 4 Drawing Figures

REPULSING CLAYS ON DRILL BITS

Matter enclosed in heavy brackets [ ] appears in the original patent but forms no part of this reissue specification; matter printed in italics indicates the additions made by reissue.

BACKGROUND OF THE DISCLOSURE

This invention relates to the prevention of bit balling while drilling wells through fine formation materials such as sticking clays.

A problem is encountered in drilling through earth formations which contain materials which stick to the [drill bit or well pipe] *drill string. This usually occurs on cutting devices, such as drill bits or reamers, or at other discontinuities in the diameter of the drill string, such as where stabilizers are inserted.* If sufficient formation materials stick to the drill bit its cutting action can be greatly reduced and the drill string can become stuck in the hole. In the event the drill string becomes stuck, certain procedures can be employed for freeing the pipe. Initially, there is an attempt to pull loose with the elevators. Next there are jars located in the drill string that are utilized in an attempt to jar loose from the formation. If the drill string cannot be extricated by the elevators or because of the lack or ineffectiveness of jars in the drill string then more expensive procedures must be employed. An attempt is usually made to remove all the pipe located above that stuck on the formation. The free point is determined and an explosive charge is utilized to loosen the connection located directly above the free point. Once the connection is loosened, the pipe above the free point can be rotated to separate it from the pipe still stuck in the hole. Once the drill pipe above the free point has been removed, wash pipe is run into the wellbore which is of a larger diameter than the stuck drill pipe remaining in the hole. When the wash pipe has been lowered over the drill pipe water is circulated down the wash pipe and up the annulus in an attempt to wash away the material binding the drill pipe. When it has been determined that the remaining portion of the drill string has been freed from the formation, a fishing tool is run into the wellbore in an attempt to spear the top joint of drill pipe in order to retrieve the drill string from the wellbore. If either the drill pipe cannot be freed by the wash over process or it cannot be retrieved with fishing tools, whipstocking up hole must be utilized in order to bypass this area. A deflecting surface is located above the stuck pipe and a new drill string is run into the hole and deflected past the stuck pipe.

It can readily be seen that these procedures are expensive and great care should be taken to avoid having stuck drill pipe. The cost of these procedures is a great deal higher if sticking is encountered in offshore wells. Even if bit balling does not result in becoming stuck, the reduced drill rate plus the necessity to pull the drill string to clean the bit and collars prove to be quite costly.

Additionally, bit balling can cause blow outs if the drill string is pulled and a high pressure zone has been drilled. When the drill string is pulled the balled up drill bit acts as a swab on the formation and causes it to blow out. Because of the tremendous cost involved with taming a blow out, great care is exercised to prevent excessive bit balling in such situations. Accordingly, more trips are made to clean and check the bit when sticking formations are drilled. Thus, the effective drilling rate is greatly reduced increasing substantially the cost of the well.

One formation material which proves most troublesome is shale composed of montmorillonite clay. This clay has two tetrahedral silica layers and a central octahedral alumina layer. This clay exhibits a large negative charge. Exchangeable cations neutralize this negative charge and exists in a cation swarm at the surface of the clay. When these cations are fully hydrated they are more loosely bonded to the clay due to its distance from the clay surface caused by the large radius of the hydrated molecule. The further these cations are from the clay, the weaker is the bond between the cations and the clay.

During a drilling operation a water base mud is generally used especially in offshore areas where oil base muds are impractical due to anti-pollution rules. When the drill bit contacts these clays the circulating water base mud acts to further hydrate the cations adjacent the clay. As the drill bit contacts the clays, the hydrated cations permit easier shearing apart of clay particles. Once these clays have been separated from the remaining clay matrix, they exist in a partially dispersed hydrated state where they have their maximum plasticity. Because the clays exhibit a large negative charge they stick to the metallic drill string upon contact. In this state the clays will build up on the drill string and will eventually disrupt the drilling operation.

One method of combatting these sticking clays is to use an oil base mud having a water phase saturated with sodium and calcium chlorides. These chlorides control the clays by osmotic pressure, where water contained in the clay will transfer to the chloride saturated water phase of the oil base mud in attempting to equalize the salt concentrations.

In offshore areas, however, oil base muds are risky to use because of anti-pollution rules. In these offshore areas, lime or gyp mud systems are frequently used to inhibit the clay swelling. The lime or gyp system prevents further hydration of the clays and often removes water held by the clays similar to the process described in the discussion of oil base muds. These lime or gyp systems however, can be fairly expensive due to dilution of the mud requiring extensive addition of mud material to keep up the mud weight. In those areas where oil base muds can be used, the greater expense of such muds over normal drilling fluid makes it desirous to find a less expensive drilling system for sticking clays.

It is therefore an object of the present invention to provide an improved drilling system for use in drilling through sticking earth formations.

SUMMARY OF THE INVENTION

With this object in view, the present invention contemplates the prevention of adherence of earth formations to drilling apparatus by impressing a negative electrical charge on the drill bit *or adjacent any other point in the drill string where such prevention is desired.* The preferred manner of impressing such negative charge is by locating, on a sub above the drill bit, a substantial amount of magnesium, thereby utilizing the differences in electromotive potential between steel and magnesium. Downhole batteries, a current generator, or an electrical line run to an energy source at the surface can also be used.

DESCRIPTION OF THE PREFERRED EMBODIMENTS

Figure 1:
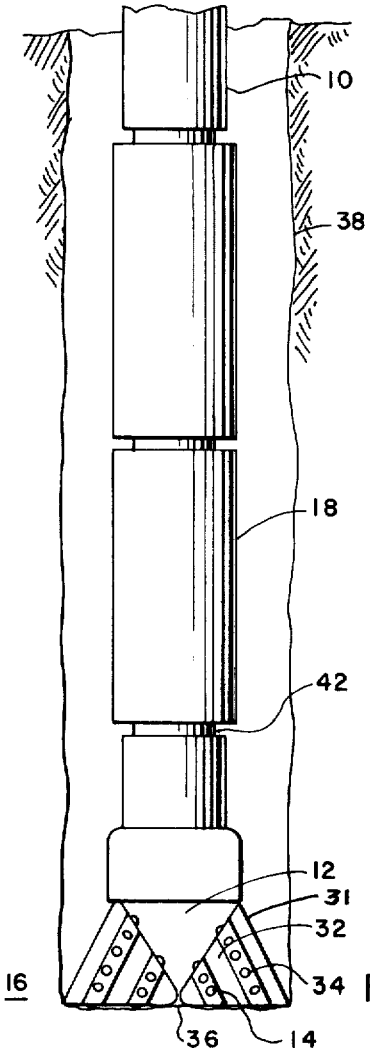
FIG. 1 is an elevational view of the lower part of a drill string having magnesium rings attached.

FIG. 1 describes a wellbore 38 having the lower end of a drill string shown therein. The drill string portion shown has a drill bit sub 10 which is a short sub having generally the same external dimensions as ordinary drill collars. This sub has annular magnesium rings 18 located thereon. These magnesium rings 18 can be placed on the sub 10 by machining down the mid portion of the sub so that this portion of the sub has a lesser diameter than the sub ends. This machined portion of the sub is indicated at 42. The annular magnesium rings 18 can then be heated to expand their internal diameter to allow the magnesium ring 18 to be slipped over the unmachined portions of the drill bit sub 10 and onto the machined area 42. Upon cooling the rings 18 becomes tightly attached to the machined portion 42 of drill bit sub 10.

The drill bit sub 10 is positioned directly above the drill bit 12 which bit is located at the bottom 36 of wellbore 38. The drill bit is of standard design and has cones [ 32 ] *31* with teeth 34, thereon. Drill bits usually are made of a case hardened steel or alloy and drill bit teeth usually are coated with a tungsten carbide material which has a high resistance to abrasion. Located at 32 between teeth 34 are magnesium inserts to provide this material directly adjacent the drill bit teeth. Because magnesium is a fairly soft material it may be preferable to locate the magnesium material in the interior of the bit or in areas on the bit exterior which are not subject to extensive wear.

For the purposes of the following discussion, it is presumed that formation 16 contains fine formation materials such as montmorillonite clay or a large amount of other small size clay which have similar adhesive properties.

In drilling into a formation 16 having fine materials which cause sticking and/or swelling the usual problem is the hydration of the clays. As the drill bit 12 engages the formation 16 the drill bit teeth 34 tend to shear apart portions of the hydrated clay. When these clays are partially dispersed they exert their maximum plasticity and have a large negative charge. Because of this large negative charge the clays are attracted to the drill bit and drill collars.

Figure 1A:
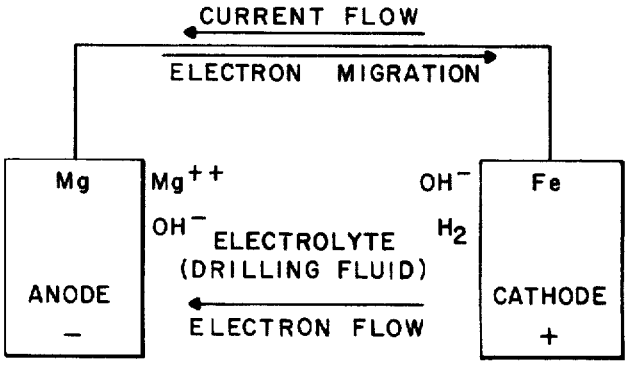
FIG. 1A is a block diagram of a cathodic action of the drill bit.

The magnesium located on the drill bit sub 10 has a high electromotive force which impresses a negative charge on the drill bit 12. Magnesium having the greater negative voltage acts as the anode and the drill bit having the lesser negative voltage acts as the cathode. This is best illustrated by reference to FIG. 1A where the magnesium ring is shown as the anode at the left and the drill bit is shown as the cathode on the right. Drilling fluid is shown in between as an electrolyte and the metallic pathway between the drill bit and magnesium connects the anode and cathode to complete the circuit.

As illustrated by FIG. 1 current flow follows the metallic pathway of the drill string from the magnesium to the drill bit when there is drilling fluid present to act as an electrolyte. Because of the potential difference between the magnesium anode and the drill bit cathode there is migration of electrons from the magnesium to the drill bit along the metallic drill string pathway. The excess electrons received at the drill bit cathode will combine with positively charged hydrogen ions in the electrolyte to form free hydrogen. With this loss of electrons, magnesium ions at the anode react with hydroxyl ions. The formation of hydrogen at the cathode drill bit also aids in preventing clays from sticking by covering the surface of the drill bit. By this process the drill bit is protected from sticking clays with the magnesium acting as a sacrificial anode.

In the practical galvanic series commercially pure magnesium exhibits −1.75 volts while clean mild steel exhibits from −0.5 to −0.8 volts. Shown below is a list of metals showing their voltage measured relative to a saturated copper-cooper sulfate reference cell.

PRACTICAL GALVANIC SERIES
(measured relative to a copper-copper sulfate reference electrode)

| Metal | Volts |
|---|---|
| Commercial pure magnesium | −1.75 |
| Magnesium alloy (6%, Al, 3% Zn, 0.15% Mg) | −1.6 |
| Zinc | −1.1 |
| Aluminum alloy (5% Zn) | −1.05 |
| Comm. pure aluminum | −0.8 |
| Mild steel (Clean and shiny) | −0.5 to −0.8 |
| Mild steel rusted | −.02 to −0.5 |
| Cast iron | −0.5 |
| Copper, brass, bronze | −0.2 |

In the event the repelling force created by the magnesium drill bit sub on the drill bit is not sufficient to repel the clay it may be necessary to place the magnesium on the drill bit 12, itself. To prevent bit balling which is a term used for an excessive build up of clay on the drill bit, it may be necessary to place magnesium inserts between the drill bit teeth. This provides a multiplicity of sacrificial anodes immediately adjacent the cutting teeth. Another location for positioning the magnesium could be between the rows of teeth on the drill bit cone [ 32 ] *31*. Because the magnesium is not very resistant to abrasion, it may be necessary to locate the magnesium on the portion of the drill bit exterior which does not directly contact the formation 16. Since all the exterior of the bit may come into contact with the formation at one time or another, it may be preferable to position the magnesium in the interior bore of the bit.

In addition to protecting the drill bit, magnesium rings can be utilized to protect stabilizers, hole openers or any other area of the drill string where sticking clays, etc. disrupt the drilling operation.

Figure 2:
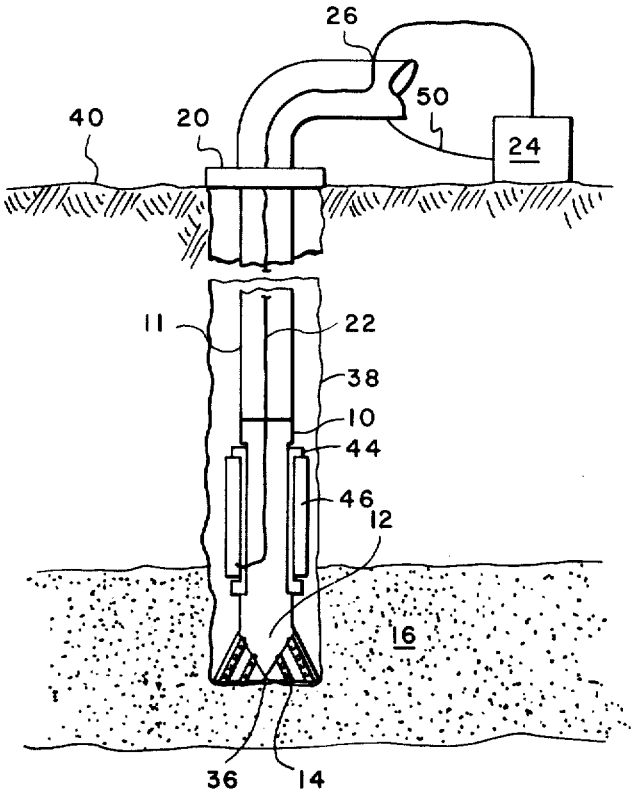
FIG. 2 is an elevational view of a drill string connected with electrical energy, shown partly in cross section.

Referring next to FIG. 2 there is seen a standard drill string 11 located in a wellbore 38 which has been drilled into a formation 16 having fine materials including clays. At the end of the drill string 11 is a standard drill bit 12 having teeth 14 thereon. These teeth 14 are shown engaging the bottom 36 of wellbore 38. Located immediately above the drill bit 12 is a drill bit sub 10. The sub is one of standard design and has been machined down to reduce the diameter of the mid portion.

An annular ring of insulating material 44 having retaining shoulders at the top and bottom is located around the machined diameter of the sub 10. Located between the retaining shoulders of the insulating material 44 is sacrificial anode material 46 such as high silicon iron. Located at the surface 40 is the top of the well 20 and a source of electrical energy 24 such as a generator or a connection with commercial electric lines. An insulated electric line 22 extends between the source of electrical energy 24 and the sacrificial anode material 46. This electrical line 22 is shown exiting the drill string 11 at 26 and is connected with the generator 24. Generator 24 is grounded to the well pipe by electrical connector 50. The electrical line 22 has been shown in the interior of the drill string, however, if mud flow down the interior of the drill string proves troublesome it may be preferable to locate this electric line 22 on the exterior of the drill string.

With the apparatus described in FIG. 2 a negative electric charge can be impressed on the drill bit 12 by supplying electric energy from source 24 through line 22 which is connected with the sacrificial anode 46. This anode then acts in the same manner as the magnesium ring described in FIG. 1. One advantage of this procedure is the ability to impress a larger negative charge on the drill bit than is possible with the bi-metallic potential difference created by the magnesium ring [ 28 ] *18* described in FIG. 1. By appropriate switching, energy can be supplied to protect the drill bit only at such times as sticking formations are being drilled. With the negative charge impressed on the drill bit, the negatively charged clay is repelled and therefore does not stick to the drill bit. In addition, the drill collars can also be negatively charged to repel sticking clays by similar apparatus at appropriate locations. One disadvantage of this system is that it cannot be effectively utilized in deeper wells due to the loss in current caused by the internal resistance of the electric line 22.

Figure 3:
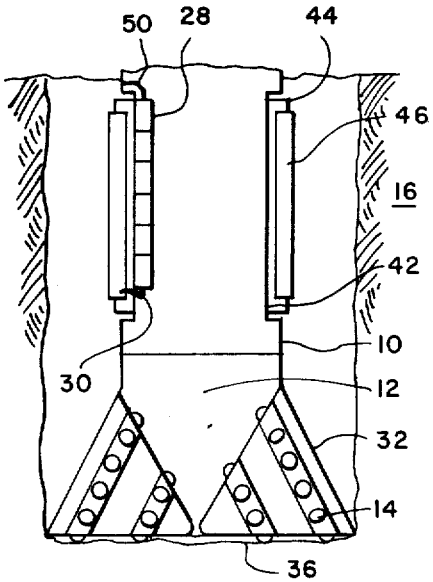
FIG. 3 illustrates an elevational view, shown partly in cross section, of the lower end of the drill string having a battery pack connected with the drill bit.

FIG. 3 describes a system which is effective in deeper formations than those which can effectively be protected by the apparatus described in FIG. 2. The lower portion of a drill string is located in a wellbore 38 which penetrates formation 16 which includes sticking materials. The drill string comprises a drill bit sub 10 below which is a drill bit 12 which is shown engaging the bottom 36 of formation 16. The drill bit 12 has drill bit cones [ 32 ] *31* having teeth 14 thereon. Shown in the interior of drill bit sub 10 is battery pack 28 located along the wall of drill bit sub 10. The battery pack 28 includes a multiplicity of batteries which are resistant to high temperatures and which are well insulated such that they will not be contaminated by drilling fluid or other liquids. An electrical connection 30 connects the battery pack 28 with a sacrificial anode material 46, insulated by material 44 such as a fiberized silica-epoxy material. The insulated anode is located on a machined down portion 42 of the sub 10.

With this apparatus it can easily be seen that a negative charge can be applied to the drill bit 12 by energy supplied by the battery pack 28 to the anode 46 to protect the drill bit 12 in the same manner as described in FIGS. 1 and 2. Thus, when the teeth 14 on the drill bit 22 contact materials to the formation 16 which have a tendency to stick to the drill bit, the charge provided by the battery pack 28 acts to repel the negatively charged fine materials such as montmorillonate clay.

By impressing a negative charge *directly adjacent a point in the drill string where repulsion of materials is desired, such as at a drill bit, a reamer or other cutting means or at a stabilizer*, by any of the methods shown in FIGS. 1–3 as a great savings can be had when drilling through troublesome formations. Sticking shales and like materials have caused substantial losses of time and money including at times the complete loss of a wellbore. Thus a great savings can be had by preventing these materials from attaching to the drill string.

While particular embodiments of the present invention have been shown and described, it is apparent that changes and modifications may be made without departing from this invention in its broader aspects, and therefore, the aim in the appended claims is to cover all such changes and modifications as fall within the true spirit and scope of this invention.

What is claimed is:

1. Process for drilling wellbores in earth formations containing materials which attach to the drill bit and drill collars comprising: positioning a metal with a substantially higher electromotive force than the drill bit at a point in the drill string directly adjacent the drill bit and between the drill collars and the drill bit for impressing a negative electrical charge on the drill bit during such time as the attaching materials are being drilled.

2. The process of claim 1 wherein the high electromotive force metallic member is an annularly shaped magnesium metal which is press fit on a conventional drill bit sub.

3. A process for drilling wellbores through a sticking shale earth formation comprising: applying a rotating drill bit to the formation; and impressing a negative charge to the drill bit while drilling through the shale formation by locating directly adjacent the drill bit a metal having a higher electromotive force than that of the drill bit.

4. Apparatus for drilling through earth formations having a high concentration of fine materials including clays comprising: a drill bit *having teeth*; drill pipe attached to the drill bit and extending to the surface; and means for impressing a negative charge on the drill bit, said impressing means being a metal which is located between the teeth on the drill bit [.], *said metal including magnesium.*

[5. The apparatus of claim 4 wherein the metal includes magnesium and is located between the teeth of the drill bit.]

6. A method for preventing the attachment of certain materials to a drill bit when drilling through earth formations having a high concentration of materials which attach to the drill bit comprising: positioning a metal member with a higher electromotive force than the drill bit in the drill string directly adjacent the drill bit and below drill collars in the drill string, rotating the drill string, and applying the rotating drill bit to the formation.

7. The method of claim 6 and further including positioning the metal member in the drill string by press fitting an annular metal sleeve on the drill bit sub.

8. Apparatus for preventing the attachment of certain materials to a drill bit when drilling through earth formations having a high concentration of materials which attach to the drill bit, including: a drill string extending to the surface and having drill collars and a drill bit at its lower end; means *including a metal member having a higher electromotive force than said drill bit* positioned in [ the ] *said* drill string below [ the ]

*said* drill collars for impressing a negative charge on [the] *said* drill bit.

[9. The apparatus of claim 8 wherein the impressing means is a metal member having a higher electromotive force than the drill bit.]

10. The apparatus of claim 8 wherein the impressing means is a magnesium sleeve press fitted on the drill bit sub.

* * * * *